{12} United States Patent
Won et al.

(10) Patent No.: US 10,382,485 B2
(45) Date of Patent: Aug. 13, 2019

(54) BLOCKCHAIN-ASSISTED PUBLIC KEY INFRASTRUCTURE FOR INTERNET OF THINGS APPLICATIONS (71) Applicant: VMware, Inc., Palo Alto, CA (US)

(72) Inventors: Jong Ho Won, West Lafayette, IN (US); Gregory Bollella, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 230 days.

(21) Appl. No.: 15/431,138

(22) Filed: Feb. 13, 2017

(65) Prior Publication Data

US 2018/0183587 A1 Jun. 28, 2018

Related U.S. Application Data (60) Provisional application No. 62/438,982, filed on Dec. 23, 2016.

(51) Int. Cl.
*H04L 9/08* (2006.01)
*H04L 9/32* (2006.01)
*H04W 4/70* (2018.01)
*G06F 21/44* (2013.01)
*H04L 29/06* (2006.01)
*H04W 12/04* (2009.01)

(52) U.S. Cl.
CPC .......... *H04L 63/166* (2013.01); *G06F 21/44* (2013.01); *H04L 9/0891* (2013.01); *H04L 9/3239* (2013.01); *H04L 9/3247* (2013.01); *H04L 9/3268* (2013.01); *H04W 4/70* (2018.02); *H04W 12/04033* (2019.01); *G06F 2221/2103* (2013.01); *H04L 2209/38* (2013.01); *H04L 2209/56* (2013.01); *H04L 2209/64* (2013.01)

(58) Field of Classification Search
CPC ... H04L 9/0861; H04L 9/0637; H04L 9/0891; H04L 9/3247; H04L 9/3263; H04L 63/166; G06F 21/44; G06F 2221/2103
See application file for complete search history.

(56) References Cited

U.S. PATENT DOCUMENTS

| | | | | |
|---|---|---|---|---|
| 10,158,480 | B1* | 12/2018 | Winklevoss | H04L 9/0825 |
| 2016/0342994 | A1* | 11/2016 | Davis | G06Q 20/027 |
| 2017/0005804 | A1* | 1/2017 | Zinder | H04L 9/3247 |
| 2017/0017936 | A1* | 1/2017 | Bisikalo | G06Q 20/065 |
| 2017/0017954 | A1* | 1/2017 | McDonough | G06Q 20/36 |
| 2017/0109735 | A1* | 4/2017 | Sheng | G06Q 20/3678 |

(Continued)

FOREIGN PATENT DOCUMENTS

WO 2017177260 10/2017

*Primary Examiner* — Techane Gergiso
(74) *Attorney, Agent, or Firm* — Patterson & Sheridan, LLP (57) ABSTRACT An approach is disclosed for registering and authenticating Internet of things (IoT) devices. In one embodiment, an installation device receives, from an IoT device, an identifier (ID) and a hash of a public key, where the IoT device itself generates the ID, the public key, and a private key. To register the IoT device, a blockchain wallet in the installation devices generates a blockchain transaction which adds the received ID and hash of the public key as a name and value pair in a name/value storage (NVS). The hash of the public key may then be retrieved from the NVS and used in authentication of the IoT device to other IoT devices or servers, among other things.

22 Claims, 8 Drawing Sheets (56) References Cited

U.S. PATENT DOCUMENTS

| | | | |
|---|---|---|---|
| 2017/0228731 A1* | 8/2017 | Sheng | G06Q 20/401 |
| 2017/0232300 A1 | 8/2017 | Tran et al. | |
| 2017/0236123 A1* | 8/2017 | Ali | G06Q 20/401 |
| | | | 705/75 |
| 2017/0372392 A1 | 12/2017 | Metnick et al. | |
| 2018/0089684 A1* | 3/2018 | McGregor | G06Q 20/4016 |
| 2018/0145979 A1 | 5/2018 | Lu et al. | |
| 2018/0204192 A1* | 7/2018 | Whaley | G06Q 20/0658 |

* cited by examiner

BLOCKCHAIN-ASSISTED PUBLIC KEY INFRASTRUCTURE FOR INTERNET OF THINGS APPLICATIONS

CROSS-REFERENCE TO RELATED APPLICATIONS

This Application claims benefit of U.S. Provisional Patent Application Ser. No. 62/438,982, filed Dec. 23, 2016, which is incorporated herein by reference in its entirety.

BACKGROUND

A public key infrastructure (PKI) provides a set of roles, policies, and procedures needed to create, manage, distribute, use, store, and revoke digital certificates and manage public-key encryption. Traditionally, communications between computers has been secured using Transport Layer Security (TLS) and its predecessor, Secure Sockets Layer (SSL), which rely on certificate authority (CA) based PKIs, such as X.509 PKIs. In such CA-based PKIs, a certificate authority issues digital certificates certifying the ownership of public keys by the named subjects of the certificates. Typically, the CA keeps its root private key secret while publishing its root public key, which is also referred to as the root certificate. Modern operating systems (OS) often maintain a list of such root certificates. Further, the actual root private/public keys need not be used, as the CA may instead generate and use intermediate private/public keys for security reasons. To authenticate one entity to another, such as a website to a web browser, the CA generates a certificate by binding a public key of the entity (e.g., Wikipedia's public key) with an ID of the entity (e.g., *.wikipedia.org) using the CA's root private key via a digital signature algorithm. The other entity, e.g., the web browser, can then verify such a certificate provided by the first entity using the CA's root certificate that was published.

"Internet of things" (IoT) is used to refer to the internetworking of physical devices, vehicles, buildings, and other objects that are embedded with electronics, software, sensors, actuators, and the like, and that have network connectivity allowing the IoT devices to collect and exchange data. Like traditional authentication between computers, IoT devices also require security functions such as authentication, confidentiality, integrity, and non-repudiation. For example, privacy-sensitive messages exchanged in IoT applications need to be encrypted and must not be altered in an unauthorized manner. In addition, data centers (e.g., that collect information from IoT devices) or IoT gateways need to be able to verify the identity of IoT devices. In some cases, IoT devices must not be able to deny having sent messages for accountability reasons.

A traditional CA can issue certificates to IoT devices for use in authentication. However, traditional CAs present a single-point-of-failure, as the CA itself can be compromised, requiring all certificates signed by the CA's private key to be regenerated and re-inserted into the IoT devices. Installing such new certificates into IoT devices after they are deployed can be very difficult, especially as many IoT devices do not have input/output devices such as keyboards or monitors. Further, manufacturers (rather than device owners) typically install certificates in IoT devices by generating a private/public key pair, sending the public key and the device's ID to a CA, receiving a certificate (which is the public key signed with the CA's private key) from the CA, and installing the certificate on the IoT device. However, this means the manufacturer of an IoT device knows the IoT device's private key, which can be leaked by, e.g., hacking the manufacturer's server. A leaked private key of an IoT device also must be revoked, which is typically handled by maintaining "certificate revocation lists (CRLs)" at the CA and using Open Certification Status Protocol (OCSP) responders to respond to requests indicating whether particular certificates are revoked or not. However, the OCSP may not always respond (e.g., it may not respond due to a distributed denial of service (DDoS) attack), and revoked certificates may still be accepted when an OSCP does not respond. In addition, the process of checking whether a certificate is revoked has a high verification overhead involving a number of initial signature verifications (three to be exact) by the requestor, one round trip between the requestor and the OSCP, time for look-up in the OSCP, one signature generation by the OSCP, and two additional signature verifications by the requestor.

SUMMARY one embodiment provides a computer-implemented method of registering a device. The method generally includes receiving, from the device, an identifier (ID) and a hash of a public key, where the device generates the ID, the public key, and a private key. The method further includes generating a blockchain transaction which adds the received ID and hash of the public key as a name and value pair in a name/value storage (NVS).

Another embodiment provides a computer-implemented method of authenticating a device. The method generally includes receiving, from the device, either information including a device ID and public key, or the device ID and a self-signed certificate, and determining, based on the device ID, whether the device is a registered device. The method further includes, if the device is a registered device, determining a hash of the public key, and comparing the determined hash of the public key with a hash of the public key retrieved from a name/value storage (NVS). In addition, the method includes, if the determined hash of the public key equals the hash of the public key retrieved from the NVS: running a challenge-response test to verify that the device has a private key corresponding to the public key; and, if the device passes the challenge-response test, authenticating the device.

Further embodiments provide a non-transitory computer-readable medium that includes instructions that, when executed, enable a computer to implement one or more aspects of the above methods, and a computer system programmed to implement one or more aspects of the above methods.

DETAILED DESCRIPTION

Embodiments disclosed herein relate to techniques for registering and authenticating Internet of things (IoT) devices. In one embodiment, an IoT device is registered in a blockchain name/value storage (NVS) by an installation device working in conjunction with the IoT device. The IoT device itself generates an ID and private/public key pair and broadcasts the ID and a hash of the public key to the installation device. The installation device runs a blockchain wallet with the NVS and adds the ID and hash of the public key broadcast by the IoT device as a name-value pair in the NVS. The hash of the public key may then be retrieved from the NVS and used in authentication of the IoT device to other IoT devices or servers, among other things. For example, a server or other IoT device may authenticate the IoT device by first receiving its ID and public key or a self-signed certificate from the IoT. The server or other IoT device may then check whether the device is a registered device (that the server or other IoT device knows about) based on the received ID and, if the device is a registered device, then the server or other IoT device may (1) compare a computed hash of the public key with a hash of the public key retrieved from the NVS, and (2) run a challenge-response test to verify that the IoT device has a private key corresponding to the public key. In addition, a revoke operation is provided so that, if an attacker obtains the IoT device owner's wallet private key, the registration of the IoT device can be revoked such that the status, name, and value of the NVS record for the IoT device cannot be modified, and the record cannot be deleted, even with the wallet private key.

Figure 1:
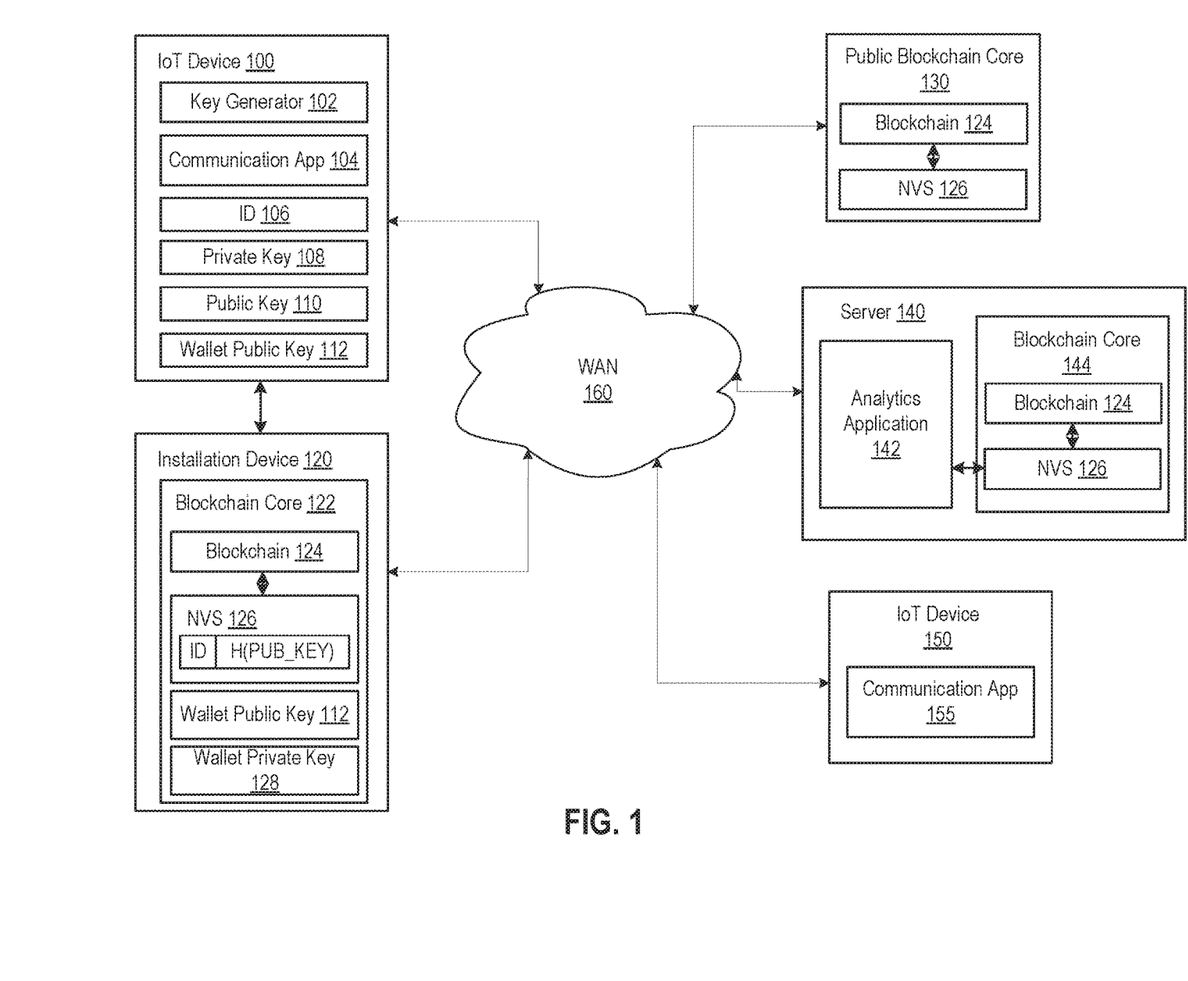
FIG. 1 depicts a computing environment in which one or more embodiments may be implemented.

FIG. 1 depicts a computing environment in which one or more embodiments may be implemented. As shown, an IoT device 100 is in communication (e.g., via 802.15 (wireless personal area network (WPAN)) or Wi-Fi) with an installation device 120, and the IoT device 100 and installation device 120 are further in communication over a wide area network (WAN) 160, such as the Internet, with a public blockchain wallet 130, a data analytics server 140, and another IoT device 150. Although shown as communicating over WAN 160, it should be understood that IoT devices may generally communicate with other IoT devices, servers, and other computing devices in any feasible manner, including via local area networks (LANs), 802.15 (WPAN), Wi-Fi, and the like.

IoT device 100 may be any type of electronic device or object with processing capability and network connectivity, such as a sensor, a camera, an actuator, a battery, a smart meter, a smart lock, a light, a parking sensor, a light, and the like. Often, IoT devices (e.g., IoT devices 100 and 150) are embedded devices with limited CPU power, memory, storage and network bandwidth (although IoT devices can also be mobile devices), which is in contrast to other devices such as servers (e.g., server 140) that have sufficient resources to run blockchain wallets and store NVSes. Illustratively, IoT device 100 includes a key generator application 102 and a communication application 104. Although discussed with respect to applications, it should be understood that, in alternative embodiments, the functionality of one or more of the applications discussed herein may be performed by other software (or even hardware). In one embodiment, key generator application 102 is configured to generate an identifier (ID) 106 for the IoT device 100 as well as a private 108 and public key 110 pair upon first powering of IoT device 100, or when a button provided on the IoT device 100 is pressed. The ID 106 that is generated may be, e.g., a random number or random sequence of numbers and characters.

To register IoT device 100 with a blockchain-assisted PKI, key generator application 102 transmits ID 106 and a hash of public key 110 to an installation device 120. In turn, a blockchain wallet application 122 (blockchain wallets are also sometimes referred to as blockchain cores) running in installation device 120 checks whether ID 106 transmitted by IoT device 100 is unique (by querying a NVS 126), and, if ID 106 is unique, then blockchain wallet 122 generates a transaction, digitally signed with the blockchain wallet's private key 128, to register ID 106 and the hash of public key 110 as a name-value pair in NVS 126. The blockchain wallet 122 is an application that maintains all valid transaction records in the blockchain, and blockchain wallet 122 may also provide a user interface allowing a user to generate new transactions manually. If the registration transaction generated by the blockchain wallet 122 is successful, blockchain wallet 122 transmits its wallet public key 112 to IoT device 100, where it is stored in a non-volatile memory and may later be used when updating the IoT device's private/public key, as discussed in greater detail below. It should be understood that use of a distinct installation device 120 that stores the blockchain wallet's private key 128 is advantageous, as it is less secure to store the IoT device private key 108 and the wallet's private key 128 together, where an attacker can steal them both at the same time.

Name/value storage 126 is an add-on feature to blockchain 124. Blockchain 124 is a distributed database that maintains a continuously-growing list of ordered transaction records called blocks, with each block having a timestamp and a link to previous blocks. Illustratively, copies of blockchain 124 and NVS 126 are maintained by blockchain wallet 122 in installation device 120 as well as public blockchain wallet 130 and server 140. At each time period, "miners," who typically maintain the public block chain wallets, attempt to find a hash value for a new block that is less than a predefined value, given a previous hash value and a hash value of all transactions in the block. This is also referred to as "proof-of-work," as the process of finding the new hash value is difficult (costly and time-consuming) but easy for others to verify afterward and satisfies certain requirements. In addition, transactions in a block of blockchain 124 cannot be altered retrospectively, as doing so would require the computationally expensive process of re-mining the block and all subsequent blocks that would take longer than the communication time of the real block.

NVS 126 is an add-on to blockchain 124 that permits name-value pairs to be registered using blockchain transactions. NVS 126 itself is a database that stores name-value pairs. Only when a name has not yet been registered can a name-value pair be inserted into the NVS 126 database, i.e., the first one who takes a name has the right to the name. Traditional NVSes permit registration of new name-value pairs, modification of a value given a name, and deleting a name-value pair through the NVS_NEW, NVS_UPDATE, and NVS_DELETE operations, respectively. Embodiments herein add an NVS_REVOKE operation for changing the "normal" status of a name/value record in the NVS to "revoked," after which the status of the record cannot be changed back to "normal," the name and value of the record cannot be modified, and the record cannot be deleted, even if an attacker has obtained the IoT device owner's wallet private key. Assuming the record is not in the "revoked" state, the IoT device owner would be able to register the IoT device, modify the stored hash value of the public key of the IoT device, and delete the IoT device from the NVS using NVS_NEW, NVS_UPDATE, and NVS_DELETE transactions, respectively, using a digital signature signed with the IoT device owner's wallet private key. For example, the transaction discussed above to register ID 106 and the hash of public key 110 (i.e., H(PUB_KEY)) as a name-value pair in NVS 126 may have the following form:

NVS operation: NVS_NEW
Input address: installation device wallet public key
Output address: installation device wallet public key
Name: ID
Value: H(PUB_KEY)
Status: Normal
Expiration: MM/DD/YYYY In addition, the contents of the transaction must be signed by the IoT device owner's wallet private key. In this example, the IoT device owner is the owner of the installation device indicated by the installation device wallet public key being the "Input address," and the IoT device ownership is not being changed, as indicated by the installation device wallet public key also being the "Output address." However, ownership of the IoT device can also be transferred by including the wallet public key of a new owner in the "Output address" field. Whoever has the wallet private key corresponding to the output address will be able to update the stored value (i.e., the hash of the IoT device's public key) later on.

One of the scenarios in which the IoT device owner may wish to update the stored hash of the IoT device's public key is when the IoT device's private key has been compromised. For example, the private key stored in the IoT device may be leaked due to a cyber or physical attack, allowing the attacker to pretend to be the IoT device, and the IoT device owner should then update the IoT device's private/public key pair. In one embodiment, such an update may include blockchain wallet 122 sending to IoT device 100 an "update command" with a digital signature signed with wallet private key 128. In turn, IoT device 100 verifies the digital signature using wallet public key 112 stored in its nonvolatile memory and, if the verification is successful, generates a new private/public key pair and transmits its ID and a hash of the newly generated public key back to blockchain wallet 122. Blockchain wallet 122 then generates an update transaction (i.e., NVS_UPDATE) to update the value associated with the ID stored in NVS 126 to be the hash of the newly generated public key.

In addition to the IoT device's private key being compromised, it is also possible for wallet private key 128 stored in installation device 120 to be compromised by an attacker. As discussed, the attacker would then be able to use the wallet private key 128 to modify the hash of the IoT device's public key stored in NVS 126, after which the IoT device cannot be authenticated by other devices using its private/public key. In one embodiment, blockchain wallet 122 is configured to generate a revocation transition (i.e., NVS_REVOKE) in such a case to change the status of the record associated with IoT device 100 in NVS 126 to "revoked," and, even if someone has the stolen wallet private key, the status of the revoked record is not allowed to be changed back to normal by another transaction; the name, value, and expiration of the record are not allowed to be modified; and the record cannot be deleted. This prevents an attacker who has the wallet private key from modifying the data in those fields using NVS_UPDATE or deleting the entry of the IoT device in the NVS using NVS_DELETE and registering a fake device with the ID that is same as the ID of the revoked device using NVS_NEW. In addition, a new wallet private/public key pair may be generated and the IoT device registration process repeated from the beginning to register the IoT device in NVS 126.

In one embodiment, blockchain wallet 122 is configured to generate a revocation transition (i.e., NVS_REVOKE) in such a case to change the data of the "status" field of the record associated with IoT device 100 in NVS 126 to "revoked." As discussed, the data of the "status" field of the revoked device's record is not allowed to be changed back to "normal" by another transaction, even if someone has the stolen wallet private key. Also, once the data in the "status" field becomes "revoked", the data in the "name" field, the "value" field and the "expiration" field in the device's record cannot be modified, and the record itself cannot be deleted even by someone who has the wallet private key. Otherwise, the attacker who has the wallet private key can modify the data in those fields using NVS_UPDATE. Or, the attacker can delete the entry of the IoT device in the NVS using NVS_DELETE and register a fake device with the ID that is the same as the ID of the revoked device using NVS_NEW. As a result, the fake device could be authenticated by others. The record of the revoked device will be deleted from NVS after the record expires as specified in the "expiration" field. Further, if the wallet private key is compromised, a new wallet private/public key pair may be generated, and the IoT device registration process repeated from the beginning to register the IoT device in NVS 126.

Once IoT device 100 has been registered with NVS 126, NVS 126 may be used in authenticating the IoT device 100 to other devices such as server 140 and IoT device 150. Illustratively, server 140 runs a data analytics application 142 that collects and analyzes data from IoT devices. For example, data analytics application 142 may collect data from multiple sensor devices and analyze such data. In such a case, mutual authentication may be performed between communication application 104 in IoT device 100 that transmits data and data analytics application 142 in server 140 that receives the data. Although sometimes discussed herein with respect to IoT devices authenticating with other IoT devices and servers, it should be understood that the authentication is actually performed by applications such as communication application 104 and data analytics application 142 that run in the IoT devices and servers and that wish to communicate with each other. In one embodiment, IoT device 100 may store a list of certificate authority (CA) root certificates and authenticate server 140 via the typical Transport Layer Security (TLS)/Secure Sockets Layer (SSL) handshake process after server 140 transmits its X.509 certificate to IoT device 100. Conversely, server 140 may authenticate IoT device 100 by receiving the IoT device's 100 ID 106, public key 110, and other relevant information from IoT device 100; checking that ID 106 belongs to a registered IoT device; computing a hash of public key 110; checking that the computed hash of public key 110 matches a hash of the IoT device's public key retrieved from NVS 126; and running a challenge-response protocol to verify that IoT device 100 has a valid private key, as discussed in greater detail below. Mutual authentication between IoT devices (e.g., between IoT device 100 and IoT device 150) may be performed in a similar manner. For example, to authenticate IoT device 100 to IoT device 150, IoT device 100 may send its ID 106, public key 110, and other relevant information to IoT device 150, after which the IoT device 150 checks that ID 106 belongs to a registered IoT device; computes a hash of public key 110; checks that the hash of public key 110 matches a hash of the IoT device's 100 public key retrieved from NVS 126; and runs a challenge-response protocol to verify that IoT device 100 has a valid private key, as discussed in greater detail below. IoT devices that have been mutually authenticated with other IoT devices or servers can then, e.g., establish secure channels (TLS/SSL) of communication.

In some embodiments, IoT devices (e.g., IoT devices 100 and 150) may actually communicate via gateways (not shown) that collect information from the IoT devices and have separate conversations with other devices across the WAN 160. In such a case, the gateways may also need to authenticate the IoT devices. Similar to the server 140 case discussed above, the gateway may send a query of an IoT device's ID to its local blockchain wallet and determine whether the hash value of the IoT device's public key is registered in the blockchain NVS. If so, the gateway can authenticate the device, and then the gateway and the device can establish a secure channel (TLS/SSL).

Figure 2:
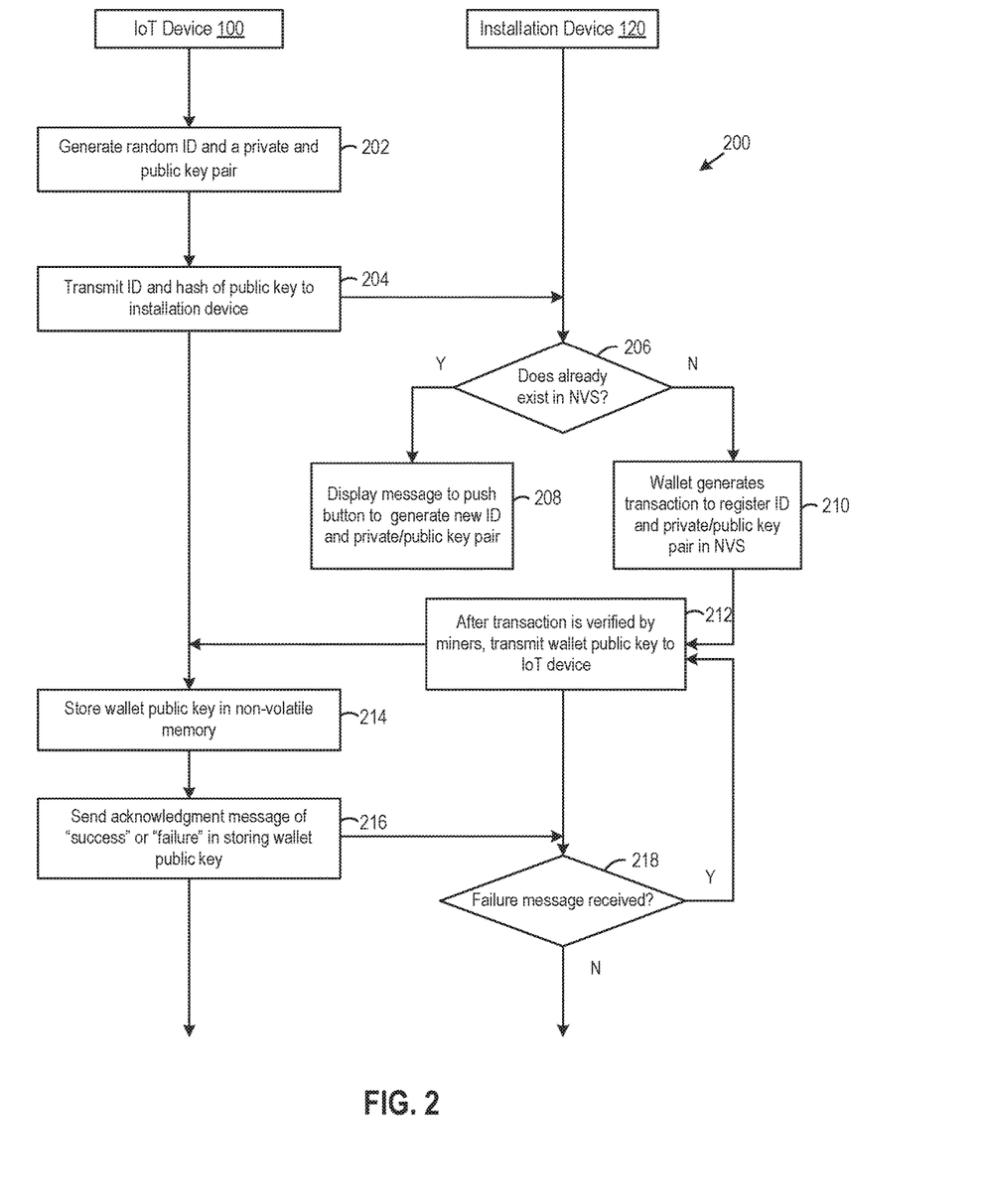
FIG. 2 is a flow diagram depicting a method for registering an internet of things (IoT) device, according to an embodiment.

FIG. 2 is a flow diagram depicting a method 200 for registering an IoT device, according to an embodiment. As shown, method 200 begins at step 202, where IoT device 100 (and more specifically, key generator 102 running in IoT device 100) generates a random ID and a private and public key pair. In one embodiment, IoT device 100 is configured such that step 402 is triggered when IoT device 100 is turned on in its initial state, e.g., after being unboxed for the first time (after its purchase). Of course, the manufacturer of IoT device 100 may also register IoT device 100. In another embodiment, a button may be provided on IoT device 100 that, when pressed, triggers step 202.

At step 204, IoT device 100 transmits the random ID and a hash of the public key it generated, i.e., ID/H(PUB_KEY), to installation device 120. As discussed, installation device 120 may be a laptop, tablet, or the like with a blockchain wallet and NVS installed, as well as a network interface to communicate with IoT device 100. Any feasible hash function HO may be used, such as the SHA-224 hash function. After generating the hash of the public key, IoT device 100 may broadcast the ID and the hash of the public key via, e.g., a Wi-Fi link layer broadcast mechanism with a low signal power, or in any other feasible manner.

At step 206, installation device 120 (and, more specifically, blockchain wallet 122 running in installation device 120) determines whether the ID sent by IoT device 100 at step 204 already exists in its NVS. As discussed, IoT device IDs are required to be unique in one embodiment, and the first IoT device 100 to register an ID may be given the right to that ID. If the ID sent by IoT device 100 already exists in the NVS, then another device must have registered the same ID before. In such a case, the ID would not be unique, and, at step 208, installation device 120 displays a message asking the user to push the IoT device 100 button again to generate another ID and private/public key pair, i.e., to restart the registration process at step 202.

If, on the other hand, installation device 120 determines that the ID sent by IoT device 100 does not exist in the NVS, then at step 210, blockchain wallet 122 running in installation device 120 generates a transaction to register the ID and hash of the public key as a name-value pair in the NVS. In one embodiment, the transaction may specify the "NVS_NEW" operation; the installation device's 120 wallet public key as input and output addresses; the ID and hash value of the public key as the name and value, respectively, to register; and an expiration date. For example, the transaction message may have the following form:

NVS operation: NVS_NEW
Input address: installation device wallet public key
Output address: installation device wallet public key
Name/Value: ID/H(PUB_KEY)
Expiration: MM/DD/YYYY It should be understood that ownership of IoT device 100 may also be transferred in this transaction by specifying a different wallet public key as the output address, in which case the owner of the different wallet would be able to update the registered value in the NVS using the different wallet's private key. In one embodiment, the registration transaction may also require a fee that is, e.g., based on the length of the ID and expiration date. Such a fee discourages users from registering many IDs that are not actually used.

At step 212, after the transaction is verified by miners, installation device 120 transmits the wallet's public key to IoT device 100, and the wallet private/public key may later be used for updates. In particular, the transaction generated by blockchain wallet 122 at step 210 is transferred to a distributed blockchain network, where it may (or may not) be confirmed. Miners solve mathematical problems to generate proof of work and confirmation of transactions in a process that typically takes ten to fifteen minutes. After a transaction is confirmed and a block added to the blockchain, only the owner of wallet private key can update the registered name/value in the future.

At step 214, IoT device 100 stores the wallet public key in its non-volatile memory. For example, IoT device 100 may store the wallet public key in a flash memory. Then, at step 216, IoT device 100 sends to installation device 120 an acknowledgment of either "success" or "failure" in storing the wallet public key. Failure may occur, for example, if there is not enough memory, a failure to write into memory, an error in writing to memory, or the like.

At step 218, if installation device 120 receives a "failure" acknowledgment message, then the method 200 returns to step 212, where installation device 120 again transmits the wallet's public key to IoT device 100.

Figure 3:
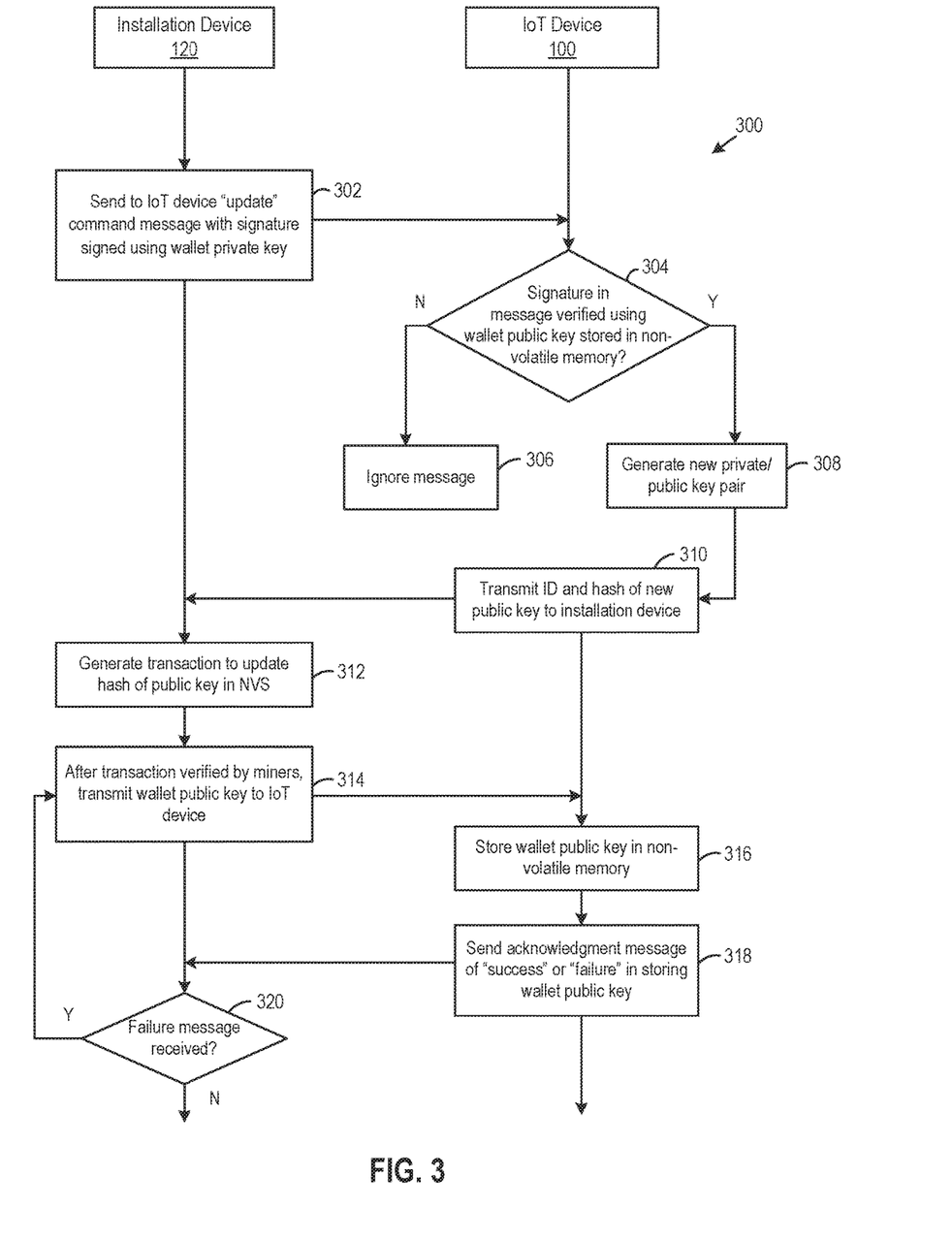
FIG. 3 is a flow diagram depicting a method for updating an IoT device's key, according to an embodiment.

FIG. 3 is a flow diagram depicting a method 300 for updating an IoT device's key, according to an embodiment. For example, IoT device's 100 private key may be leaked by an attack on IoT device 100, in which case the device owner (either the original owner or an owner to which device ownership has been transferred) must update the previous private key/public key pair. Otherwise, someone having IoT device's 100 private key can pretend to be IoT device 100.

As shown, method 300 for updating IoT device's 100 key begins at step 302, where installation device 120 (and more specifically, blockchain wallet 122 running in installation device 120) sends to IoT device 100 an "update" command message with a digital signature signed using the installation device 120 wallet's private key. In one embodiment, the message may include M={"UPDATE"‖NONCE} and Signature (M), where NONCE is a value changed over time to prevent replay attacks.

At step 304, IoT device 100 (and more specifically, key generator 102 running in installation device 100) verifies the signature in the "update" command message using the wallet public key stored in its non-volatile memory. That is, IoT devices 100 uses the wallet public key, stored in its nonvolatile memory at step 214, to decrypt the signature Signature(M) and verify that it matches the rest of the message M.

If IoT device 100 does not verify the signature in the "update" command message, then IoT device 100 ignores the message at step 306. Otherwise, if IoT device 100 verifies the signature in the "update" command message, then at step 308, IoT device 100 generates a private/public key pair. Then, at step 310, IoT device 100 transmits its ID and a hash of the new public key to installation device 120. For example, IoT device 100 may again broadcast ID/H (PUB_KEY) via a Wi-Fi link layer broadcast mechanism with a low signal power.

At step 312, the blockchain wallet in installation devices 120 generates a transaction to update the hash of the public key in the NVS. In one embodiment, the transaction may specify the "NVS_UPDATE" operation; the installation device's 120 wallet public key as input and output addresses (or a different wallet's public key if the owner of IoT device 100 wishes to transfer ownership of the device); the ID and hash value of the new public key as the name and value, respectively; and an expiration date. For example, the transaction message may have the following form:
  NVS operation: NVS_UPDATE
  Input address: installation device wallet public key
  Output address: installation device wallet public key
  Name/Value: ID/H(PUB_KEY)
  Expiration: MM/DD/YYYY The remaining steps are similar to steps 212-218 discussed above with respect to FIG. 2. In particular, at step 314, after the transaction is verified by miners, installation device 120 transmits the wallet's public key to IoT device 100. At step 316, IoT device 100 stores the wallet public key sent by installation device 120 in its non-volatile memory. Then, at step 318, IoT device 100 sends to installation device 120 an acknowledgment of either "success" or "failure" in storing the wallet public key. At step 320, if installation device 120 receives a "failure" acknowledgment message, then the method 300 returns to step 314, where installation device 120 again transmits the wallet's public key to IoT device 100.

Figure 4:
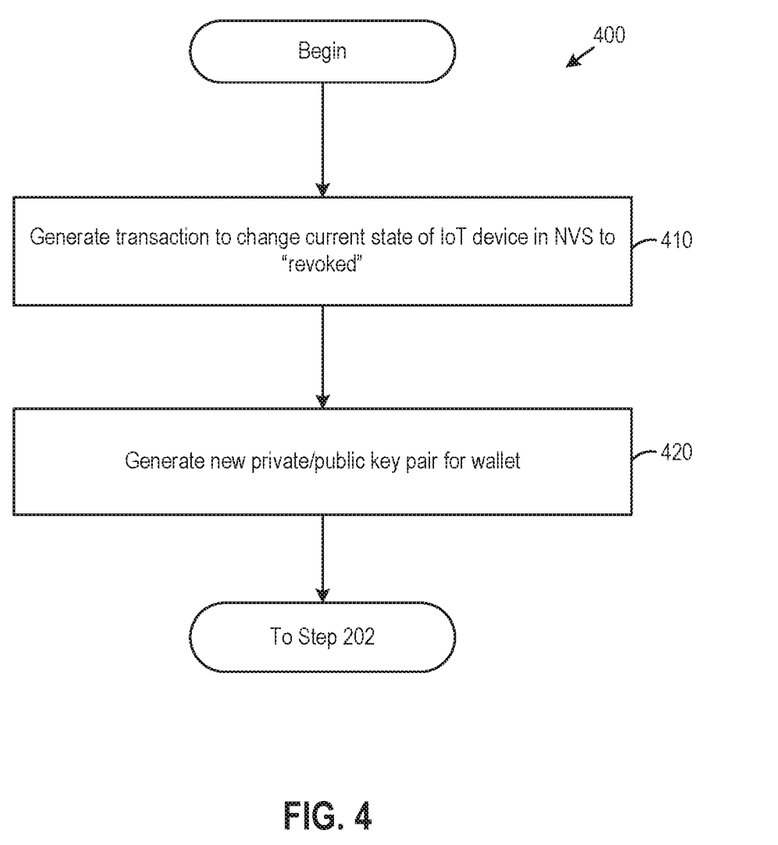
FIG. 4 is a flow diagram depicting a method for revoking an IoT device in a name/value storage (NVS), according to an embodiment.

FIG. 4 is a flow diagram depicting a method 400 for revoking an IoT device in an NVS, according to an embodiment. If an attacker steals installation device's 120 (or a subsequent IoT device owner's) wallet private key, then such an attacker would be able to manipulate the hash value of IoT device 100's public key in the NVS, after which IoT device 100 cannot be authenticated by others. As a result, the owner of IoT device 100 must update the state of the device in the NVS to revoke the previous registration of IoT device 100 after the wallet private key is stolen. A result of such a revocation is that the IoT device owner cannot use the device's ID any longer (because it is "revoked" in the blockchain NVS) and must create a new ID.

As shown, method 400 for revoking an IoT device in the NVS begins at step 402, where the installation (or subsequent IoT device owner's) device 120 blockchain wallet generates a transaction to change the current state of IoT device 100 in the NVS to "revoked." In one embodiment, the transaction may specify the "NVS_REVOKE" operation; the IoT device 100 owner's wallet public key as input and output addresses; and the ID and hash value of the public key being revoked as the name and value, respectively. For example, the transaction message may have the following form:
  NVS operation: NVS_REVOKE
  Input address: IoT device owner's wallet public key
  Output address: IoT device owner's wallet public key
  Name/Value: ID/H(PUB_KEY)

The blockchain is configured so that, once the state of device is set to "revoked" from the normal state, even the owner of wallet private key cannot change this state, and the revoked ID/hash value pair will reside in the NVS until its expiration date (because the ID, hash value, and expiration are not allowed to be modified or deleted). Accordingly, while the state of IoT device 100 is set to revoked, an attacker having the wallet private key cannot change the state of the device, and the revoked device cannot go back to the normal state. Without the "revoked" state, an attacker who steals the wallet private key could update the stored hash value or delete and create a new ID and hash value of the public key entry in the NVS for IoT device 100 using the same ID of the IoT device 100, and other devices would then be unable to distinguish if IoT device 100 is under the rightful owner's control or the attacker's control. By setting the state of IoT device 100 to "revoked" but storing the revoked ID/hash value pair in the NVS until its expiration date, other devices that receive messages purportedly from IoT device 100 and having a signature signed by the private key of IoT device 100 can query the NVS to check if IoT device 100 is in the normal or revoked state. If IoT device 100 is in the normal state, then the other device can trust IoT device 100. Otherwise, if IoT device 100 is in the revoked state, then the other device may ignore the message purportedly from IoT device 100.

At step 404, installation device 120 generates a new private/public key pair for the blockchain wallet. Then, method 400 returns to step 202 of method 200 to begin the IoT device 100 registration process again. That is, if the wallet private key is stolen, the owner must generate a new wallet private/public key pair and return to the first step in device registration, where the device is in its initial state and generates a new ID and private/public key pair. This is because the wallet private key is similar to a certificate authority's root private key, and like the certificate authority's root private key, the wallet public/private key pair must be regenerated and re-inserted into the IoT device if the wallet private key is stolen.

Figure 5:
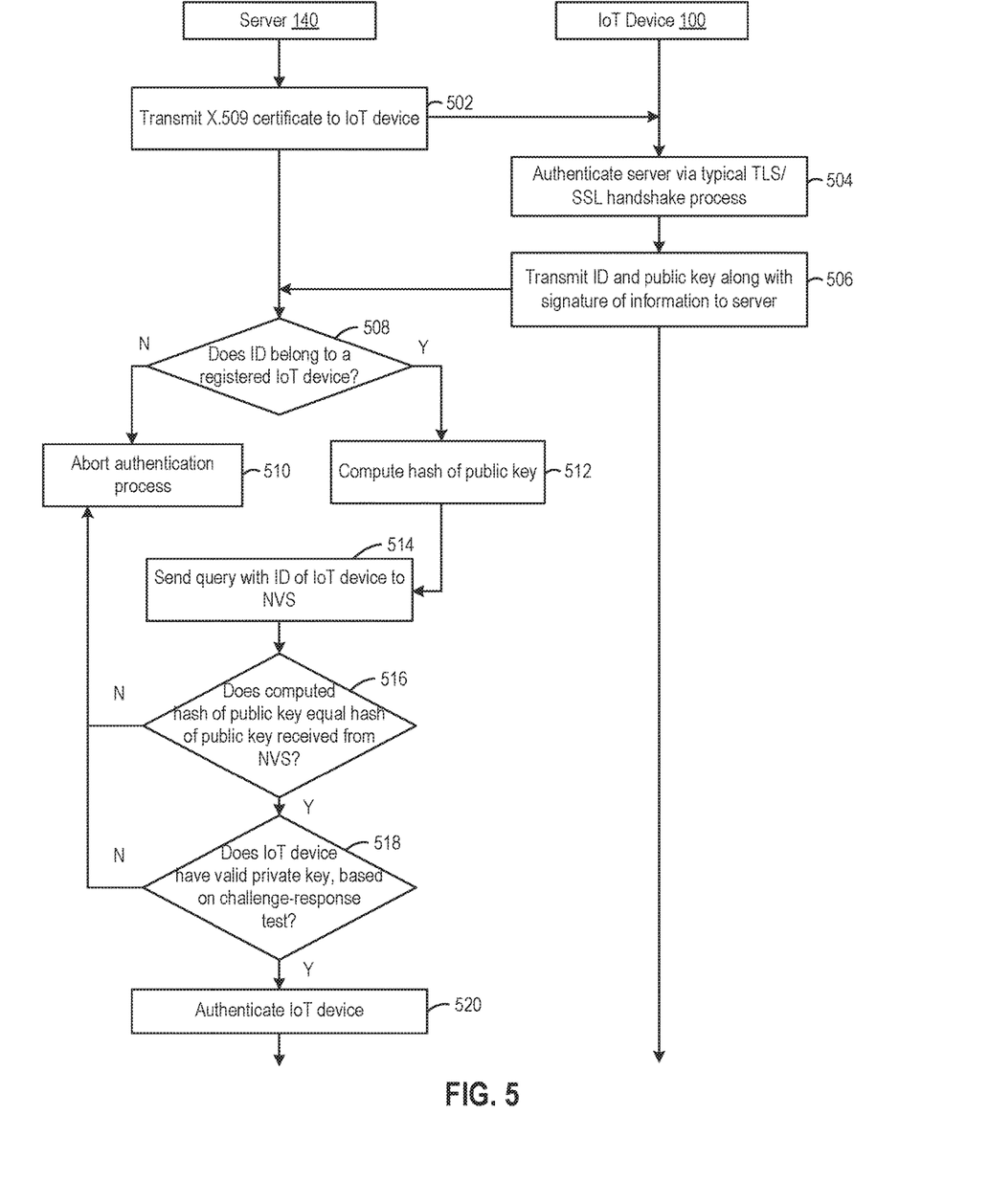
FIG. 5 is a flow diagram depicting a method for mutual authentication between an IoT device using a blockchain-assisted public key infrastructure (PKI) and a server relying on a traditional certificate authority based PKI, according to an embodiment.

FIG. 5 is a flow diagram depicting a method 500 for mutual authentication between an IoT device using a blockchain-assisted PKI and a server relying on a traditional certificate authority PKI, according to an embodiment. Although discussed with respect to a server, it should be understood that method 500 is applicable to other types of computing devices such as desktops, laptops, and tablet computers. In order for the IoT device 100 to authenticate server 140, server 140 (and more specifically, analytics application 142 running in server 140) transmits the server's X.509 certificate to IoT device 100 at step 502. Then, at step 504, IoT device 100 (and more specifically, communication application 104) authenticates server 140 via the typical TLS/SSL handshake process. As discussed, IoT device 100 stores a list of root certificates that can be used in this TLS/SSL handshake process.

In order for server 140 to authenticate IoT device 100, at 506, IoT device 100 transmits its ID, public key, the public key algorithm (ALG), the blockchain name (BLK), and potentially other information (ETC), along with the signature of (ID∥public key∥ALG∥BLK∥ETC), to server 140. ALG is the signature algorithm used by IoT device 100, e.g., RSA with 2048-bit key length or Elliptic Curve Cryptography with SECP256r1. BLK is the blockchain name that IoT device 100 is registered in. ETC may include, e.g., the manufacturer name and the serial number of IoT device 100. In an alternative embodiment, IoT device 100 may send its ID and a self-signed certificate. A self-signed certificate is signed by the same entity and can generally include information such as a serial number, signature algorithm, encryption algorithm, owner, etc. A self-signed certificate guarantees that contents in the self-signed certificate is generated by the owner of the private key and not altered by others. When IoT device 100 send its ID and a self-signed certificate, such a self-signed certificate may include information about the blockchain used to register the IoT device's ID/H(PUB_KEY).

At step 508, server 140 determines whether the ID belongs to a registered IoT device. This assumes that server 140 has a list of registered IoT devices. For example, the IoT devices may be sensors, and server 140 may be a data analytics server that gathers information from sensors whose IDs are registered with the data analytics server. As discussed, installation device 120 is able to see IoT device IDs during the device registration procedure. In such a case, installation device 120 may automatically register the IDs of IoT devices with server 140, or a user may manually register the IDs of the IoT devices with the server 140.

If server 140 determines that the ID does not belong to a registered device, then server 140 aborts the authentication process at step 510. On the other hand, if server 140 determines that the ID belongs to a registered device, then, at step 512, server 140 computes a hash of the public key. That is, server 140 computes hash h=H(PUB_KEY) using, e.g., the SHA-224 hash function.

At step 514, server 140 sends a query with the ID of IoT device 100 to the NVS. If the ID exists as a name in the NVS, then the NVS will return a hash h' of the public key which is the value associated with the ID in the NVS, as well as a state and an expiration time. That is, the NVS returns h'(value), state, and expiration, where the value is the public key associated with the name that is the ID.

Assuming the RVS returns such a hash of the public key, the state, and the expiration time (otherwise, the server may abort the authentication process), and the state is not "revoked" and the expiration time has not passed, then at step 516, server 140 determines whether the hash of the public key computed at step 512 equals the hash of the public key received from the NVS, i.e., whether h=h'. Computing whether the hashes are equal is needed because, if IoT device 100 owner's wallet private key is compromised, an attacker can change the hash of the IoT device 100 public key that is stored as the value in the NVS. As a result, server 140 can infer that there is a mismatch problem if the hash of the public key provided by the NVS is different from the hash value of public key that it computes at step 512.

If the hash of the public key computed at step 512 does not equal the hash of the public key received from the NVS, then IoT device 100 is not authenticated, and method 500 ends. On the other hand, if the hash of the public key computed at step 512 equals the hash of the public key received from the NVS, then method 500 proceeds to step 518, where server 140 runs a challenge-response protocol to verify that IoT device 100 has a valid private key associated with the public key. For example, server 140 may generate a symmetric key (k), encrypt the symmetric key using the public key and send the encrypted key to IoT device 100. In such a case, IoT device 100 would only be able to decrypt the encrypted symmetric key if it has the necessary private key, in which case IoT device 100 may decrypt the encrypted symmetric key using the private key and send a "success" message encrypted using the symmetric key, i.e., $ENC_k$("success").

If IoT device 100 passes the challenge-response test, then at step 520, server 100 authenticates the IoT device 100.

Figure 6:
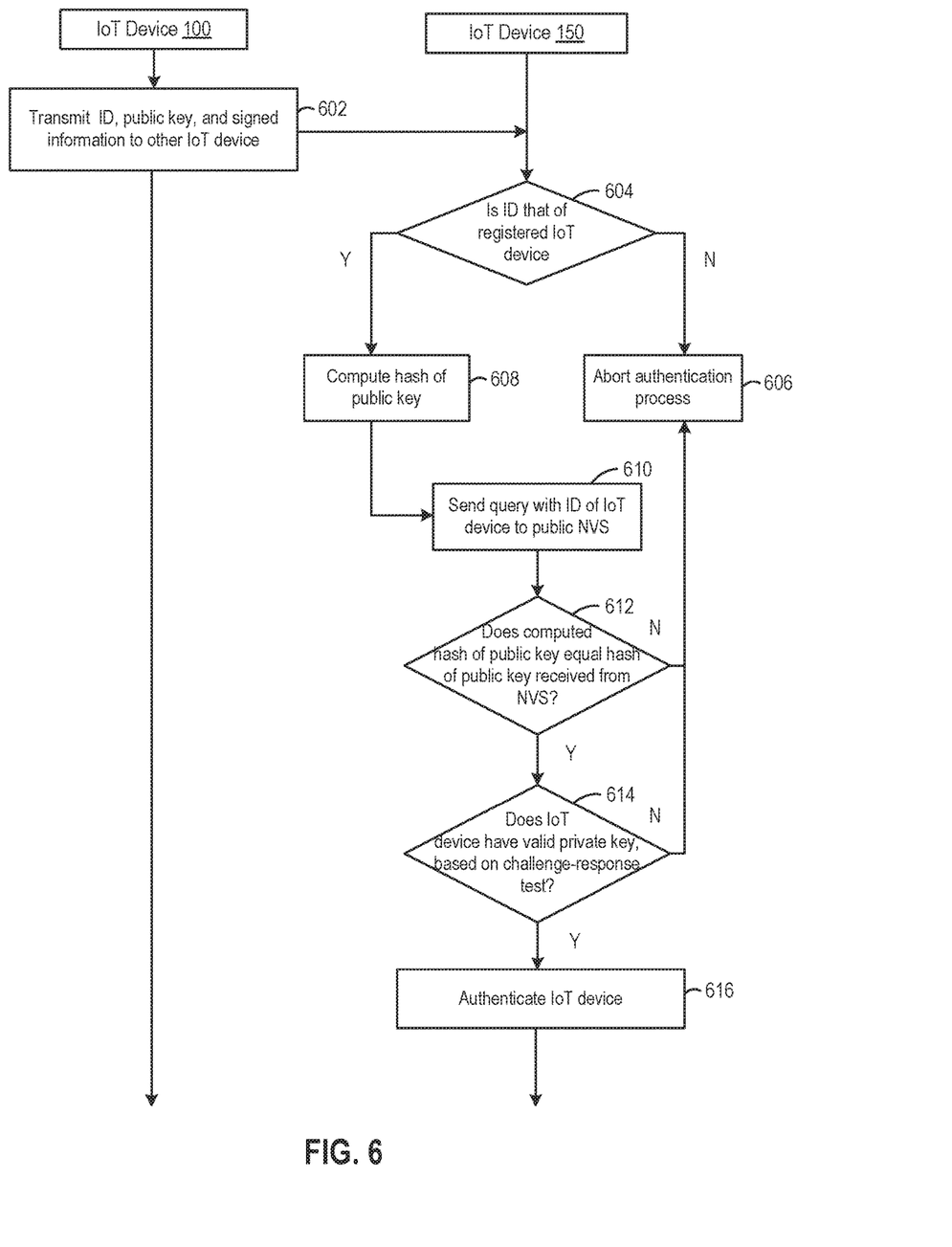
FIG. 6 is a flow diagram depicting a method for mutual authentication between two IoT devices that both use a blockchain-assisted PKI, according to an embodiment.

FIG. 6 is a flow diagram depicting a method 600 for mutual authentication between two IoT devices that both use a blockchain-assisted PKI, according to an embodiment. For example, a car may wish to authenticate a parking meter, and vice versa. As shown, method 600 begins at step 602, where IoT device 100 (and more specifically, communication application 104 running in IoT device 100) sends its ID, public key, and other relevant information to the other IoT device 150 (and more specifically, to communication application 155 running in IoT device 150). Similar to step 506 discussed above, the other relevant information may include the public key algorithm (ALG), the blockchain name (BLK), potentially other information (ETC) along with the signature of (ID||public key||ALG||BLK||ETC), where ALG is the signature algorithm used by IoT device 100, BLK is the blockchain name that IoT device 100 is registered in, and ETC may include, e.g., the manufacturer name and the serial number of IoT device 100. In an alternative embodiment, IoT device 100 may send its ID and a self-signed certificate, which as discussed may include information about the blockchain used to register the IoT device's ID/H(PUB_KEY).

At step 604, IoT device 150 determines whether the ID is that of a registered IoT device. This assumes that the IoT device 150 knows IDs of other IoT devices, similar to the server with the list of registered IoT devices discussed above with respect to step 508. For example, a car may have a list of IDs of parking meters that can be used in authenticating those parking meters.

If IoT device 150 determines that the ID is not that of a registered IoT device, then the authentication processes is aborted at step 606 and method 600 ends. On the other hand, if the IoT device 150 determines that the ID is that of a registered IoT device, then at step 608, IoT device 150 computes a hash h of the public key.

At step 610, IoT device 150 sends a query of the ID to the NVS of a public blockchain wallet. If the ID exists in the public blockchain wallet, then the public blockchain wallet will return a hash of the value, a state, an expiration time, as well as a signature using its private key, i.e., r={h'(value), state, expiration} Signature(r). If, however, the ID does not exist in the NVS, then the public blockchain wallet will return a message indicating that the ID does not exist along with a signature, i.e., r={"not exist"}, Signature(r).

Assuming the public blockchain wallet returns the hash of the value, the state, and the expiration time (otherwise, IoT device 150 may abort the authentication process), and that the state is not "revoked" and the expiration time has not passed, then, at step 612, IoT device 150 checks whether the hash of the public key received from the public blockchain wallet is the same as the hash of the public key computed by IoT device 150 at step 608, i.e., whether h=h'. This is similar to step 516 discussed above and is used to detect mismatches indicating that an attacker has stolen the wallet private key and changed the hash of the public key in the NVS. If the hash of the public key received from the public blockchain wallet does not equal the hash of the public key computed by IoT device 150, then IoT device 150 does not authenticate IoT device 100.

On the other hand, if the hash of the public key received from the public blockchain wallet equals the hash of the public key computed by IoT device 150, then method 600 continues to step 614, where IoT device 150 runs a challenge-response protocol to verify that IoT device 100 has a valid private key. Similar to step 518 discussed above, the challenge-response protocol may include, e.g., generating a symmetric key (k), encrypting the symmetric key using the public key, and sending the encrypted key to IoT device 100. If IoT device 100 has the necessary private key, then IoT device 100 decrypts the encrypted symmetric key using the private key and sends a "success" message encrypted using the symmetric key, i.e., $ENC_k$("success").

Then, at step 616, IoT device 150 authenticates IoT device 100 if IoT device 100 passes the challenge-response test. The steps of method 600 may be repeated, but with the roles of the IoT devices 100 and 150 reversed, for IoT device 100 to authenticate IoT device 150.

Figure 7:
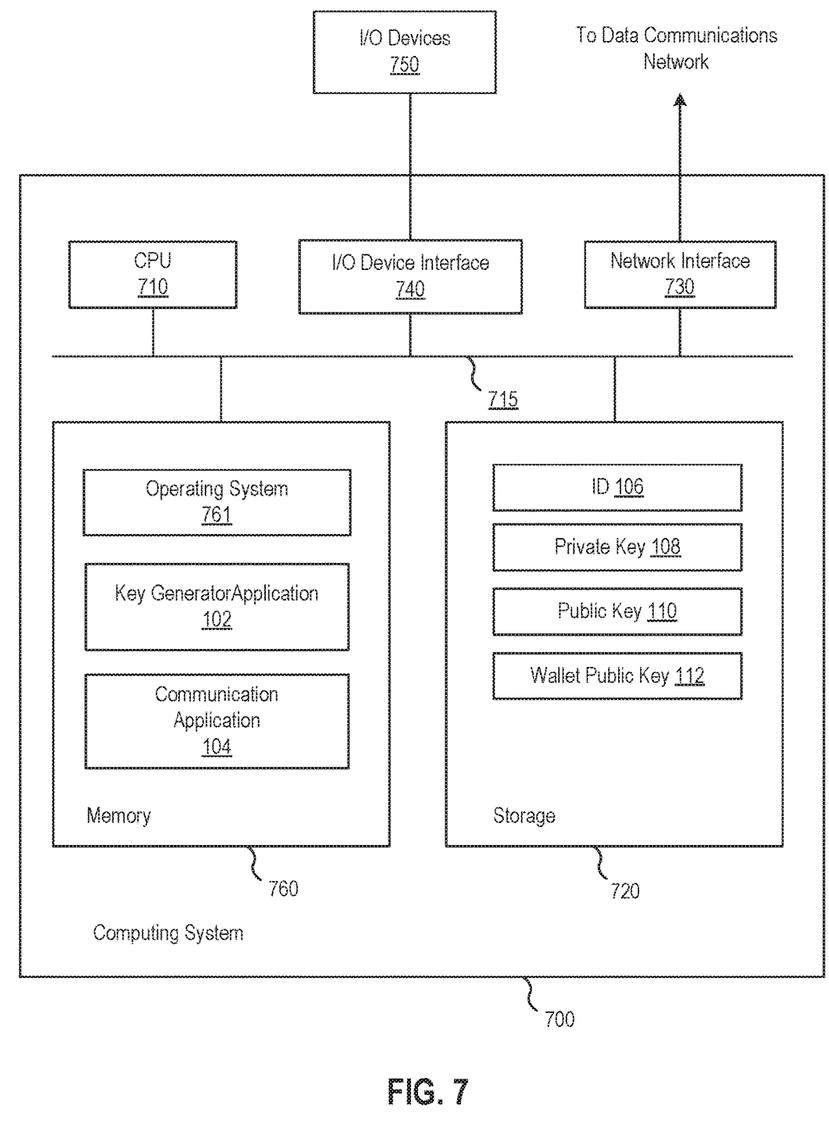
FIG. 7 illustrates an example of an IoT device, according to an embodiment.

FIG. 7 illustrates an example of an IoT device 700, according to an embodiment. IoT device 700 corresponds to IoT device 100 in FIG. 1. As shown, IoT device 700 includes, without limitation, a central processing unit (CPU) 710, a network interface 730, an interconnect 715, a memory 760, and storage 720. Optionally, IoT device 700 may also include an I/O device interface 740 connecting I/O devices 750 (e.g., keyboard, display and mouse devices) to IoT device 700.

CPU 710 retrieves and executes programming instructions stored in memory 760. Similarly, CPU 710 stores and retrieves application data residing in memory 760. Interconnect 715 facilitates transmission, such as of programming instructions and application data, between CPU 710, I/O device interface 740, storage 720, network interface 730, and memory 760. CPU 710 is representative of one or more of a single CPU, multiple CPUs, a single CPU having multiple processing cores, one or more graphics processing units (GPUs), and the like. And memory 760 is generally included to be representative of a random access memory. Storage 720 is a non-volatile memory and may be a combination of fixed or removable storage devices, such as flash drives, disk drives, removable memory cards or optical storage, network attached storage (NAS), or a storage area-network (SAN). Further, IoT device 700 is included to be representative of a physical computing system as well as virtual machine instances hosted on a set of underlying physical computing systems. Further still, although shown as a single IoT device, one of ordinary skill in the art will recognized that the components of IoT device 700 shown in FIG. 7 may be distributed across multiple computing systems connected by a data communications network.

As shown, memory 760 includes an operating system 761, key generator application 102, and communication application 104. It should be understood that, although not shown, operating system 761, key generator application 102, and communication application 104 are also stored in storage 720 so that they are not deleted when IoT device 700 is turned off. In one embodiment, key generator application 102 is configured to generate device IDs and private/public key pairs responsive to the press of a button (not shown), the initial powering on of IoT device 100, and responsive to an "update" command from an blockchain wallet 122. In addition, key generator application 102 is configured to communicate with blockchain wallet 122 during device registration and device key updating to transmit IDs and hashes of public keys that are generated, as well as to receive and store the wallet's 112 public key, as discussed above with respect to methods 200 and 300.

Communication application 104 is configured to exchange data with other devices (e.g., IoT devices and servers) over a network. For example, if IoT device 700 is a sensor, then communication application 104 may collect sensor data and transmit such data to an analytics server. In one embodiment, communication application 104 is configured to permit IoT device 700 to be mutually authenticated with a server (or other computer) using a traditional CA-based PKI by performing the typical TLS/SSL handshake process after receiving the server's X.509 certificate to authenticate the server, as well as transmitting IoT device's 700 ID, public key, and other relevant information to the server so that the server can check that the ID belongs to a registered IoT device; compute a hash of the public key; check that the computed hash matches a hash of the IoT device's public key retrieved from an NVS; and run a challenge-response protocol to verify that IoT device 700 has a valid private key, as discussed above with respect to 500. In addition, communication application 104 may be configured to permit IoT 700 device to be mutually authenticated with another IoT device that also uses a blockchain-assisted PKI. In one embodiment, to authenticate the other IoT device, communication application 104 receives from the other IoT device an ID, public key, and other relevant information; checks that the received ID belongs to a registered IoT device; computes a hash of the received public key; checks that the computed hash matches a hash of the other IoT device's public key retrieved from an NVS; and runs a challenge-response protocol to verify that the other IoT device has a valid private key. In addition, the reverse procedure (sending IoT device's 700 ID, public key, and other relevant information, etc.) may be employed to authenticate IoT device 700 to the other device, as discussed above with respect to method 600.

Figure 8:
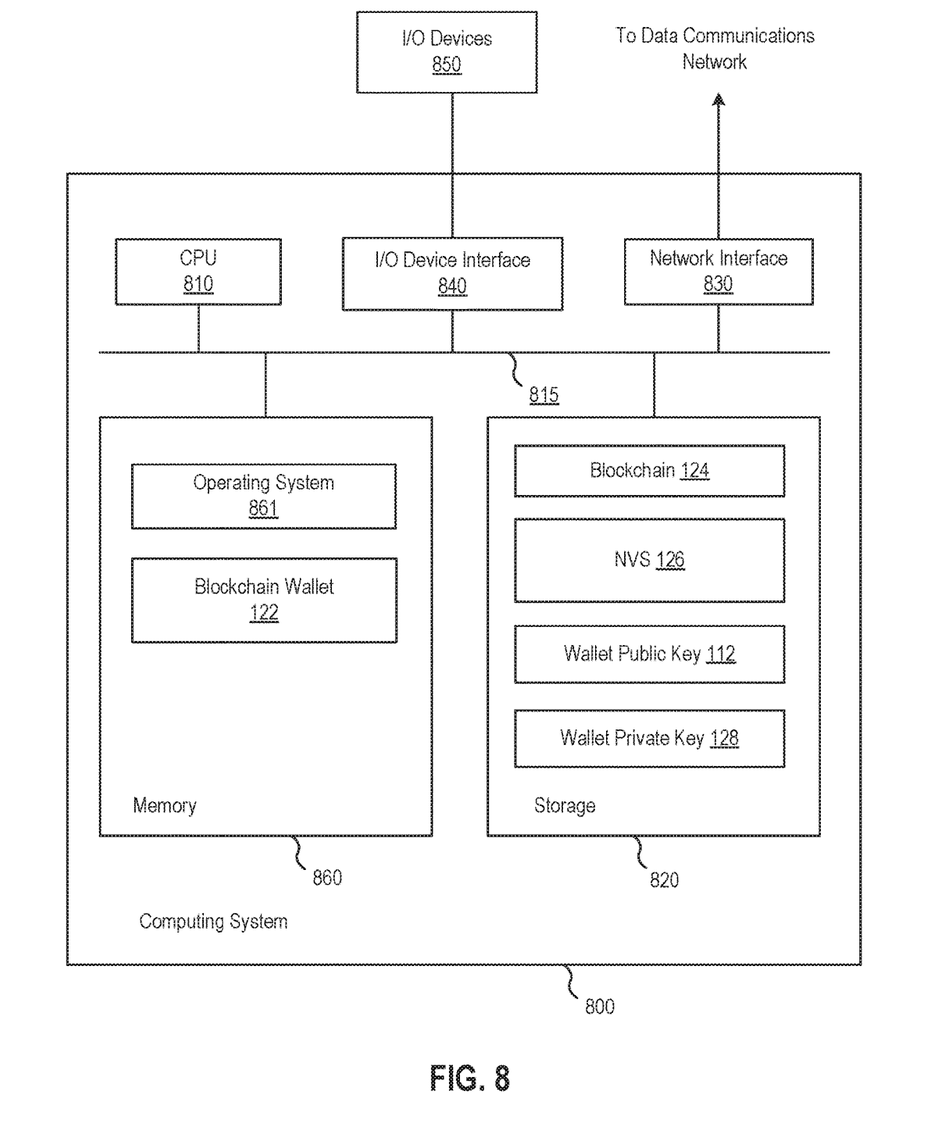
FIG. 8 illustrates an example of an installation computer system, according to an embodiment.

FIG. 8 illustrates an example of an installation computer system 800, according to an embodiment. System 800 corresponds to installation device 120 in FIG. 1. System 800 includes, without limitation, a central processing unit (CPU) 810, a network interface 830, an interconnect 815, a memory 860, and storage 820. However, system 800 may generally have more processing power and storage than IoT device 700. For example, system 800 may be a laptop or tablet computer. Illustratively, system 800 may also include an I/O device interface 840 connecting I/O devices 850 (e.g., keyboard, display and mouse devices) to the system 800.

CPU 810 retrieves and executes programming instructions stored in memory 860. Similarly, CPU 810 stores and retrieves application data residing in memory 860. Interconnect 815 facilitates transmission, such as of programming instructions and application data, between CPU 810, I/O device interface 840, storage 820, network interface 830, and memory 860. CPU 810 represents one or more of a single CPU, multiple CPUs, a single CPU having multiple processing cores, one or more graphics processing units (GPUs), and the like. And memory 860 is generally included to be representative of a random access memory. Storage 820 may be, e.g., a disk drive storage device or flash drive. Similar to storage 720, storage 820 may be a combination of fixed or removable storage devices, such as fixed disc drives, flash drives, removable memory cards or optical storage, network attached storage (NAS), or a storage area-network (SAN). Further, system 800 is included to be representative of a physical computing system as well as virtual machine instances hosted on a set of underlying physical computing systems. Further still, although shown as a single computing system, one of ordinary skill in the art will recognized that the components of system 800 shown in FIG. 8 may be distributed across multiple computing systems connected by a data communications network.

As shown, memory 860 includes an operating system 861 and a blockchain wallet application 122. For example, operating system 861 may include Linux® or Microsoft Windows®. It should be understood that, although not shown, operating system 861 and blockchain wallet application 122 are also stored in storage 820 so that they are not deleted when system 800 is turned off. Blockchain wallet application 122 is configured to assist in registering IoT devices by listening to IDs and hashes of public keys transmitted by IoT devices, generating NVS transactions to register such IDs and hash of public keys as name-value pairs in the NVS, and, if the registration is successful, sending its own wallet public key to the IoT device, as discussed above with respect to method 200. Further, blockchain wallet application 122 may be used to update IoT device keys in the NVS if an IoT device's private key is leaked by sending to that IoT device an "update" command with a digital signature signed with the wallet private key, listening for an ID and hash of a new public key generated by the IoT device responsive to the "update" command, and generating a transaction to update the value associated with the IoT device's ID in the NVS, as discussed above with respect to method 300. In addition, blockchain wallet 122 may be used to update the state of a device in the NVS, in case the wallet's private key is leaked, by generating a transaction that changes the state to "revoked" so that the entry in the NVS cannot be modified or deleted even by someone who has the stolen wallet private key, as discussed above with respect to method 400.

Although discussed herein with respect to IoT devices, it should be understood techniques disclosed herein may also be used with non-IoT devices such as traditional computers, servers, and mobile devices. Although blockchain-assisted PKIs and CA-based PKIs are discussed herein separately, it should be understood that the two may also be used together. For example, a blockchain-assisted PKI can be integrated into implementations of the SSL and TLS protocols such as OpenSSL. OpenSSL in particular permits TLS/SSL communication channels to be established using traditional X.509 CA-signed certificates as well as other types of certificates. In one embodiment, the certificate used during the TLS/SSL handshake may be a self-signed certificate that includes information about the blockchain used to register the IoT device's ID/H(PUB_KEY). A device with blockchain-PKI enabled OpenSSL would be able to handle both traditional X.509 certificate authentication and blockchain-based authentication. In one embodiment, such a device may determine whether the IoT device presents a traditional X.509 certificate or the self-signed certificate that provides the information about the blockchain used to register the IoT device's ID/H(PUB_KEY). If the certificate is the X.509 certificate, then traditional CA-based authentication may be used. If the certificate is the self-signed certificate, then the device may authenticate the IoT device by determining if the hash of the IoT device's public key is registered in the blockchain NVS, as discussed above.

Advantageously, techniques disclosed herein provide a blockchain-assisted PKI for IoT applications. Use of a blockchain and NVS mitigates the single-point-of-failure problem associated with traditional certificate authorities, discussed above. A private/public key pair is generated by the IoT device itself (e.g., at installation time) without the need of a keyboard or web interface and stored in the IoT device, so not even the manufacturer of the device knows the private key. As a result, IoT device private keys cannot be leaked by simply hacking the manufacturer's server. Further, techniques are disclosed that permit easy registration, update, and revoking of IoT device IDs and hash values of public keys in an NVS. In particular, the IoT device's private key and an installation device's wallet private key are kept on distinct devices. If the IoT device's private key is leaked, then the owner of the blockchain wallet (e.g., the installation device blockchain wallet) can instruct the IoT device to regenerate its private/public keys and update the value in the NVS. If the blockchain wallet private key is leaked, then the owner of the wallet private key can mark the name-value pair for the IoT device in the blockchain as "revoked." The blockchain-assisted PKI does not require OSCP responders to verify whether the status of an IoT device has been set to revoked, unlike traditional certificate-authority based authentication. In addition, the device status verification process has low overhead (two verifications and one NVS look-up verification).

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method of registering a device to a computer system, the computer system comprising a blockchain and a name/value storage (NVS), wherein the NVS is an add-on database to the blockchain, wherein name and value pairs in the NVS can be modified using a modify operation and deleted using a delete operation, the method comprising:
   receiving, from the device, an identifier (ID) and a hash of a public key, wherein the device generates the ID, the public key, and a private key; and
   generating a first blockchain transaction, wherein the first blockchain transaction adds the received ID and hash of the public key to a first block, and adds the first block to a blockchain, wherein the received ID and hash of the public key located within the first block cannot be altered retrospectively, and further wherein the first blockchain transaction adds the received ID and hash of the public key as a name and value pair in the NVS.

2. The method of claim 1, further comprising:
   transmitting, to the device, a blockchain wallet public key;
   receiving, from the device, a first message indicating whether the device successfully stored the blockchain wallet public key in a non-volatile memory; and
   if the first message indicates that the device did not successfully store the blockchain wallet public key in the non-volatile memory, re-transmitting the blockchain wallet public key to the device.

3. The method of claim 2, further comprising:
   transmitting, to the device, a second message instructing the device to generate a new public key and a new private key, wherein the second message includes a signature signed with a private key of the blockchain wallet, and wherein the device verifies the signature using the blockchain wallet public key stored in the non-volatile memory;
   receiving a hash of the new public key from the device; and
   generating a second blockchain transaction which updates the value associated with the ID of the device to be the hash of the new public key.

4. The method of claim 1, further comprising, generating a third blockchain transaction which changes a status of the ID and the hash of the public key in the NVS to revoked, wherein, in the revoked status, a blockchain wallet private key cannot be used to modify or delete the status, the ID, the hash of the public key, or an associated expiration date in the NVS.

5. The method of claim 4, wherein the ID and the hash of the public key in the NVS that are revoked are maintained in the NVS until the expiration date.

6. The method of claim 1, wherein, subsequent to the first blockchain transaction which adds the received ID and hash of the public key in the name/value storage (NVS), the device is authenticated to another computing device by:
   transmitting, by the device to the other computing device, either information including the ID and the public key, or the ID and a self-signed certificate;
   determining, by the other computer device based on the ID, whether the device is a registered device; and
   if the device is a registered device:
      determining, by the other computing device, a hash of the public key,
      comparing, by the other computing device, the determined hash of the public key with a hash of the public key retrieved from the NVS, and
      if the determined hash of the public key equals the hash of the public key retrieved from the NVS:
         running, by the other computing device, a challenge-response test to verify that the device has the private key; and
         if the device passes the challenge-response test, authenticating, by the other computing device, the device.

7. The method of claim 6, wherein the NVS from which the public key is retrieved is an NVS of a public blockchain wallet.

8. The method of claim 1, wherein:
   the ID is a random value; and
   the device generates the ID, the public key, and the private key during installation of the device or in response to a press of a button on the device.

9. The method of claim 1, wherein the first blockchain transaction specifies as an input address a first owner's wallet public key and as an output address a second owner's wallet public key.

10. The method of claim 1, wherein the device is one of a sensor, a camera, an actuator, a battery, a smart meter, a smart lock, a light, a parking sensor, or a light.

11. The computer-implement method of claim 1, wherein each name-value pair in the NVS is unique.

12. A non-transitory computer-readable medium comprising instructions executable by a computer, the computer having one or more physical central processing units (CPUs), wherein the instructions, when executed, cause the computer to perform operations for registering a device to a computer system, the computer system comprising a blockchain and a name/value storage (NVS), wherein the NVS is an add-on database to the blockchain, wherein name and value pairs in the NVS can be modified using a modify operation and deleted using a delete operation, the operations comprising:
   receiving, from the device, an identifier (ID) and a hash of a public key, wherein the device generates the ID, the public key, and a private key; and
   generating a first blockchain transaction, wherein the first blockchain transaction adds the received ID and hash of the public key to a first block, and adds the first block to a blockchain, wherein the received ID and hash of the public key located within the first block cannot be altered retrospectively, and further wherein the first blockchain transaction adds the received ID and hash of the public key as a name and value pair in the NVS.

13. The computer-readable medium of claim 12, the operations further comprising:

transmitting, to the device, a blockchain wallet public key;

receiving, from the device, a first message indicating whether the device successfully stored the blockchain wallet public key in a non-volatile memory; and if the first message indicates that the device did not successfully store the blockchain wallet public key in the non-volatile memory, re-transmitting the blockchain wallet public key to the device.

14. The computer-readable medium of claim 12, the operations further comprising:

transmitting, to the device, a second message instructing the device to generate a new public key and a new private key, wherein the second message includes a signature signed with a private key of the blockchain wallet, and wherein the device verifies the signature using the blockchain wallet public key stored in the non-volatile memory;

receiving a hash of the new public key from the device; and generating a second blockchain transaction which updates the value associated with the ID of the device to be the hash of the new public key.

15. The computer-readable medium of claim 12, the operations further comprising, generating a third blockchain transaction which changes a status of the ID and the hash of the public key in the NVS to revoked, wherein, in the revoked status, a blockchain wallet private key cannot be used to modify or delete the status, the ID, the hash of the public key, or an associated expiration date in the NVS.

16. The computer-readable medium of claim 15, wherein the ID and the hash of the public key in the NVS that are revoked are maintained in the NVS until the expiration date.

17. The computer-readable medium of claim 12, wherein, subsequent to the first blockchain transaction which adds the received ID and hash of the public key in the name/value storage (NVS), the device is authenticated to another computing device by:

transmitting, by the device to the other computing device, either information including the ID and the public key, or the ID and a self-signed certificate;

determining, by the other computer device based on the ID, whether the device is a registered device; and if the device is a registered device:

determining, by the other computing device, a hash of the public key, comparing, by the other computing device, the determined hash of the public key with a hash of the public key retrieved from the NVS, and if the determined hash of the public key equals the hash of the public key retrieved from the NVS:

running, by the other computing device, a challenge-response test to verify that the device has the private key; and if the device passes the challenge-response test, authenticating, by the other computing device, the device.

18. The computer-readable medium of claim 17, wherein the NVS from which the public key is retrieved is an NVS of a public blockchain wallet.

19. The computer-readable medium of claim 12, wherein:

the ID is a random value; and the device generates the ID, the public key, and the private key during installation of the device or in response to a press of a button on the device.

20. The computer-readable medium of claim 12, wherein the first blockchain transaction specifies as an input address a first owner's wallet public key and as an output address a second owner's wallet public key.

21. A computer system comprising:

a blockchain;

a name/value storage (NVS), wherein the NVS is an add-on database to the blockchain, wherein name and value pairs in the NVS can be modified using a modify operation and deleted using a delete operation;

a processor, wherein the processor is programmed to carry out a method of registering a device to the computer system, the method comprising:

receiving, from the device, an identifier (ID) and a hash of a public key, wherein the device generates the ID, the public key, and a private key; and generating a first blockchain transaction, wherein the first blockchain transaction adds the received ID and hash of the public key to a first block, and adds the first block to a blockchain, wherein the received ID and hash of the public key located within the first block cannot be altered retrospectively, and further wherein the first blockchain transaction adds the received ID and hash of the public key as a name and value pair in the NVS.

22. The computer system of claim 21, the method further comprising:

transmitting, to the device, a blockchain wallet public key;

receiving, from the device, a first message indicating whether the device successfully stored the blockchain wallet public key in a non-volatile memory; and if the first message indicates that the device did not successfully store the blockchain wallet public key in the non-volatile memory, re-transmitting the blockchain wallet public key to the device.

\* \* \* \* \*